(12) United States Patent
Kai et al.

(10) Patent No.: US 7,108,278 B2
(45) Date of Patent: Sep. 19, 2006

(54) AIR BAG APPARATUS FOR SIDE CRASH

(75) Inventors: Takeshi Kai, Saitama-ken (JP);
Takashi Nakamura, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/055,844

(22) Filed: Jan. 23, 2002

(65) Prior Publication Data

US 2002/0096869 A1    Jul. 25, 2002

(30) Foreign Application Priority Data

Jan. 23, 2001  (JP) ............................. 2001-014974
Jan. 24, 2001  (JP) ............................. 2001-015508

(51) Int. Cl.
*B60R 21/16*    (2006.01)

(52) U.S. Cl. ................ 280/730.2; 280/739; 280/743.1; 280/743.2

(58) Field of Classification Search ............ 280/730.2, 280/739, 743.1, 729, 743.2, 749
See application file for complete search history.

(56) References Cited

U.S. PATENT DOCUMENTS

| | | | |
|---|---|---|---|
| 5,570,900 A | | 11/1996 | Brown |
| 5,785,350 A | * | 7/1998 | Inoue et al. ............. 280/743.2 |
| 5,893,579 A | * | 4/1999 | Kimura et al. ........... 280/730.2 |
| 6,129,377 A | * | 10/2000 | Okumura et al. ........ 280/730.2 |
| 6,142,517 A | * | 11/2000 | Nakamura et al. .......... 280/739 |
| 6,170,860 B1 | * | 1/2001 | Denz et al. ............. 280/730.2 |
| 6,220,625 B1 | * | 4/2001 | Wallner et al. .......... 280/730.2 |
| 6,386,578 B1 | * | 5/2002 | Nanbu et al. ............ 280/730.2 |
| 6,561,539 B1 | * | 5/2003 | Sunabashiri et al. ..... 280/730.1 |

FOREIGN PATENT DOCUMENTS

| | | |
|---|---|---|
| JP | 49-116743 | 10/1974 |
| JP | 51-20334 | 2/1976 |
| JP | H5-238347 | 9/1993 |
| JP | H8-268213 | 10/1996 |
| JP | 09-272394 | 10/1997 |
| JP | 09-315245 | 12/1997 |
| JP | 10-175497 | 6/1998 |
| JP | 10-338097 | 12/1998 |
| JP | 11-042999 | 2/1999 |
| JP | 11-048906 | 2/1999 |
| JP | 2000-85517 | 3/2000 |
| JP | 2000-255369 | 9/2000 |

* cited by examiner

*Primary Examiner*—Eric Culbreth
(74) *Attorney, Agent, or Firm*—Carrier, Blackman & Associates, P.C.; Joseph P. Carrier; William D. Blackman

(57) ABSTRACT

An air bag apparatus for side crash, includes an acceleration sensor, an inflater and an air bag. The acceleration sensor detects acceleration in a side direction larger than a predetermined value to generate a detection signal. The inflater generates a gas in response to the detection signal. The air bag is folded initially, and expands with the gas. The air bag includes a main section and a protrusion section which is provided at a tip portion of the main section such that an inner space of the protrusion section is connected with an inner space of the main section. The protrusion section has at least one opening from which the gas is spouted. The air bag further includes at least one partition provided in an inner space of the air bag.

17 Claims, 11 Drawing Sheets

Fig. 14A
Fig. 14B
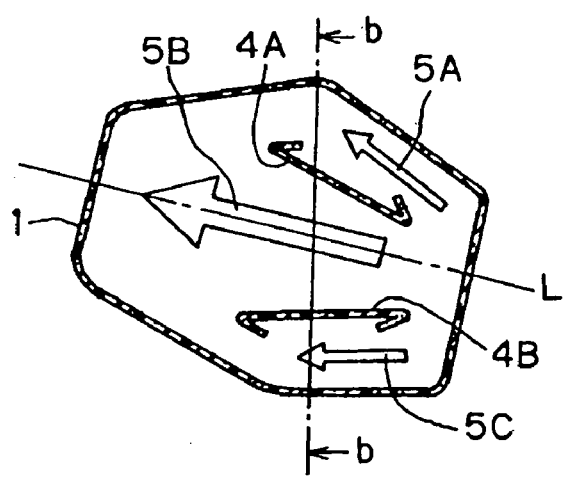
Fig. 15A
Fig. 15B
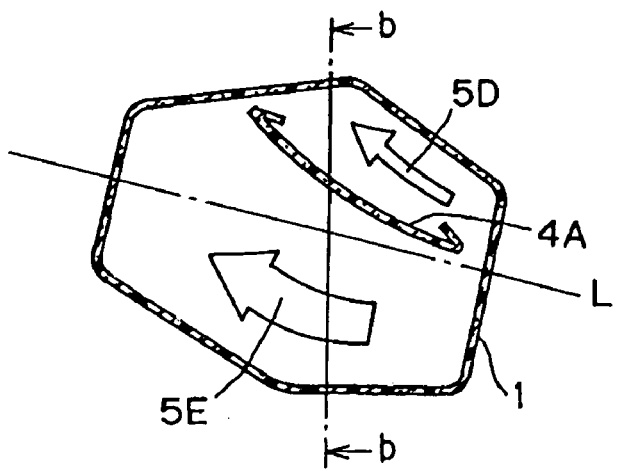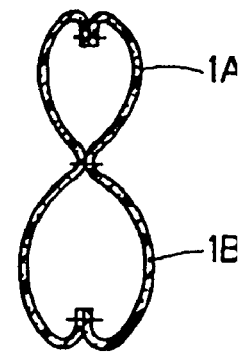

AIR BAG APPARATUS FOR SIDE CRASH

BACKGROUND OF THE INVENTION

1. Field of the Invention

The present invention relates to an air bag apparatus, and more particularly, to an air bag apparatus for side crash.

2. Description of the Related Art

An air bag apparatus is provided for a car to protect the body of a rider like a driver or a passenger. As the air bag apparatuses for the car, an air bag apparatus for head-on collision and an air bag apparatus for side crash are known. The air bag apparatus for side crash is provided between a center pillar or a door and the rider to protect the body of the rider, especially, the chest of the rider.

As shown in FIGS. 1 and 2, the air bag apparatus for side crash is composed of an air bag 102 whose proximal end is stuck to a side section 101 of a seat and which expands due to gas inflation by an inflater 103 in case of side crash at a moment. As shown in FIG. 2, the air bag is folded and embedded in the side section 101 of the seat before the expansion. However, if the side direction acceleration sensor operates, the inflater 103 operates to supply a high-pressure gas into the air bag 102 at a moment. As a result, the air bag 102 expands in the direction shown by an arrow a, between the chest of the rider and the sidepiece 104 of the car to protect the body of the rider.

In such an air bag apparatus for side crash, the air bag expands rapidly at the expansion start stage, and expands gradually at the stage in which the body of the rider receives protection power from the air bag. Especially, it is desirable for the air bag shrink at that time. Such an air bag apparatus for side crash is described in Japanese Laid Open Patent Application (JP-A-Heisei 8-268213: a first conventional example). In the first conventional example, holes are opened on the middle portion of the air bag. However, because there is fear that the holes receive any damage when expanding, a perimeter of the hole is reinforced. Thus, the reinforcement effect around the hole is excellent. In the first conventional example, the reinforcement effect is achieved by the formation of the protrusion. Such a protrusion is folded and the protrusion is pushed into the inner space of the air bag. In the first conventional example, the expansion is rapid at the expansion start stage and contraction is carried out at the expansion end stage. Also, it is important that the air bag apparatus for side crash expands to a predetermined final shape at a moment in the narrow space between the rider and the side body of the car.

Another air bag apparatus is known in the Japanese Laid Open Patent Application (JP-P2000-85517A: a second conventional example) in which the proximal end of an air bag is formed with a hard member to extend and expand smoothly in a front direction. The 3-dimensional final shape of the air bag in the expansion is determined through sewing a combination of a plurality of sheets of cloth. The expansion of the air bag and the final shape depend strongly on the inner pressure and the shape of the plurality of sheets of cloth rather than the external force. Especially, the final shape of the air bag is determined based on the initial shape.

The effort to make the final shape good is shown in FIG. 3. In the air bag apparatus for side crash shown in FIG. 3, by limiting the expansion width W in the direction perpendicular to the side surface of the air bag 105 within a predetermined value, the shape on the expansion way is controlled. To make such limitation effective, an inner forming section (an inner side panel) 106 of the air bag and an outer forming section (an outer side panel) 107 are linked by suspenders or hanging bands 108 which are formed inside the air bag. By limiting the length of the suspenders or hanging bands 108 in the perpendicular direction, the above-mentioned width W on the expansion way can be determined. In this way, the width W can be limited in some degree but the angle of the suspender 108 in the perpendicular direction is instable. Such instability makes the width W in the perpendicular direction instable.

In conjunction with the above description, an air bag apparatus is disclosed in Japanese Laid Open Patent Application (JP-A-Heisei 5-238347). In this reference, the air bag apparatus is installed in a side door. The length of a hanging belt is longer than the length of a sewing portion.

SUMMARY OF THE INVENTION

An object of the present invention is to provide an air bag apparatus for side crash, which can use the expansion energy efficiently through the expansion process of an air bag.

Another object of the present invention is to provide an air bag apparatus for side crash in which an air bag can expands rapidly from an expansion start stage of the expansion to an effective expansion stage and then gas can be bumped or spouted after the effective expansion stage or in an expansion end stage.

Still another object of the present invention is to provide an air bag apparatus for side crash, in which the expansion of an air bag and bumping of gas can be surely carried out through the shape design of the air bag.

Yet still another object of the present invention is to provide an air bag apparatus for side crash, in which the shape of an air bag on the way of expansion can be more surely controlled.

It is another object of the present invention to provide an air bag apparatus for side crash, in which the flow of gas on the way of expansion can be controlled.

In an aspect of the present invention, an air bag apparatus for side crash, includes an acceleration sensor, an inflater and an air bag. The acceleration sensor detects acceleration in a side direction larger than a predetermined value to generate a detection signal. The inflater generates a gas in response to the detection signal. The air bag is folded initially, and expands with the gas. The air bag includes a main section and a protrusion section which is provided at a tip portion of the main section such that an inner space of the protrusion section is connected with an inner space of the main section. The protrusion section has at least one opening from which the gas is spouted.

Here, the protrusion section may have a pipe shape with openings at opposing ends. Instead, the protrusion section may have the at least one opening in a portion connected with the main section.

Also, the protrusion section may be pushed into the inner space of the main section initially, or may be pushed into the inner space of the main section initially such that the protrusion section is turned inside out.

Also, the main section may include first and second side panels, which are sewed in a limb portion such that outer surfaces of the first and second side panels are joined to each other.

In this case, it is desirable that the air bag has at least one partition provided in the inner space of the main section. The partition is formed by sewing a predetermined portion of the first and second side panels. The predetermined portion may be a curved line, a circle, or a semicircle.

The predetermined portion is provided to determine an expansion direction of the air bag during an expanding process.

In another aspect of the present invention, an air bag apparatus for side crash, includes an acceleration sensor, an inflater and an air bag. The acceleration sensor detects acceleration in a side direction larger than a predetermined value to generate a detection signal. The inflater generates a gas in response to the detection signal. The air bag is folded initially, and expands with the gas. The air bag has at least one partition provided in an inner space of the air bag.

The air bag may include first and second side panels, which are sewed in a limb portion such that outer surfaces of the first and second side panels are joined to each other. The partition may be formed by sewing a predetermined portion of the first and second side panels. The predetermined portion may be a curved line, a circle or a semicircle.

It is desirable that the predetermined portion is provided to determine an expansion direction of the air bag during an expanding process.

In still another aspect of the present invention, an air bag used for an air bag apparatus for side crash, includes a main section, and a protrusion section which is provided at a tip portion of the main section such that an inner space of the protrusion section is connected with an inner space of the main section. The air bag is folded initially, and expands with a gas from an inflater, and the protrusion section has at least one opening from which the gas is spouted.

The protrusion section may have a pipe shape with openings at opposing ends, or the opening in a portion connected with the main section.

The protrusion section may be pushed into the inner space of the main section initially, or may be pushed into the inner space of the main section initially such that the protrusion section is turned inside out.

In yet still another aspect of the present invention, an air bag used for an air bag apparatus for side crash, includes first and second side panels. The first and second side panels are sewed in a limb portion for supportively contacting a limb of a passenger, such that outer surfaces of the first and second side panels are joined to each other. The air bag further may include at least one partition provided in an inner space of the air bag, which is folded initially, and which expands with gas supplied from an inflater.

The partition may be formed by sewing a predetermined portion of the first and second side panels. The predetermined portion may be a curved line, a circle or a semicircle.

BRIEF DESCRIPTION OF THE DRAWINGS

FIG. 14A is a front cross sectional view showing the air bag of the air bag apparatus in the second embodiment, and FIG. 14B is a side cross sectional view showing the air bag of the air bag apparatus in the second embodiment;

FIGS. 15A and 15B are a front cross sectional view and a side cross sectional view showing the first modification of the air bag of the air bag apparatus in the second embodiment;

DESCRIPTION OF THE PREFERRED EMBODIMENTS

Hereinafter, an air bag apparatus for side crash of the present invention will be described below in detail with reference to the attached drawings.

Figure 1:
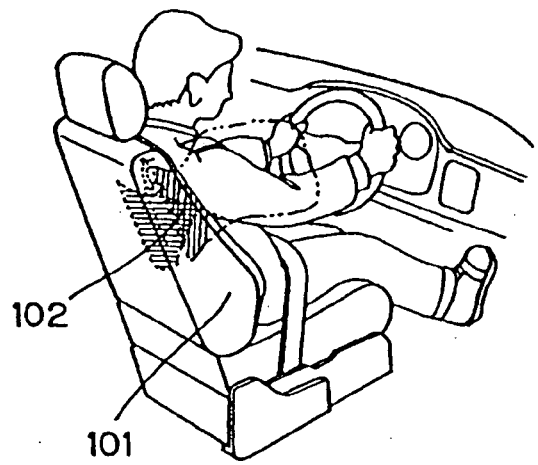
FIG. 1 is a perspective view showing an air bag apparatus for side crash in a first conventional example.
Figure 2:
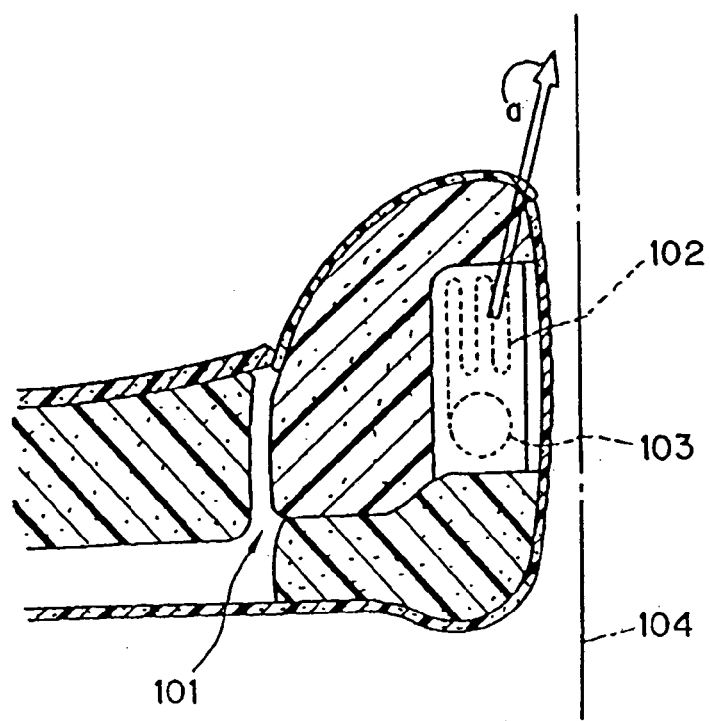
FIG. 2 is a plane cross sectional view of the air bag apparatus for side crash in the first conventional example.
Figure 3:
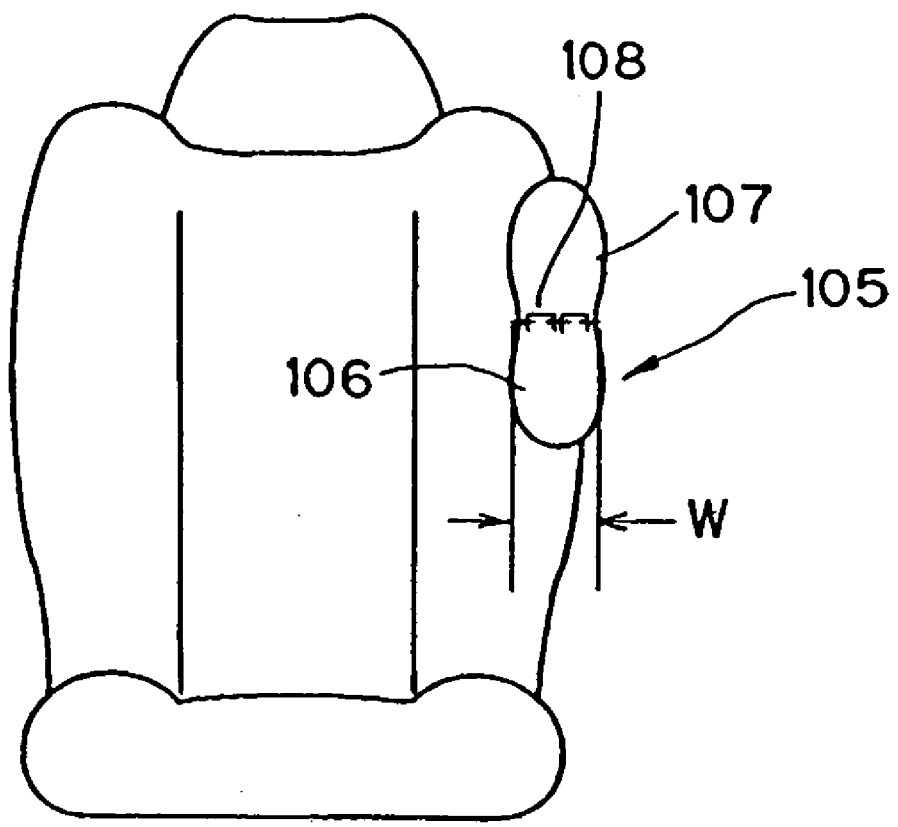
FIG. 3 is a front view showing an application example of the air bag apparatus for side crash in a second conventional example.
Figure 4:
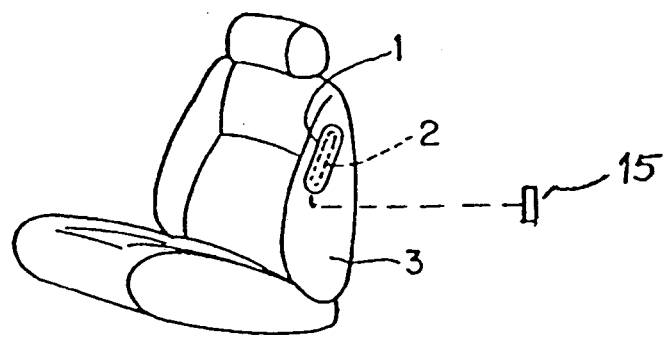
FIG. 4 is a perspective view showing an installation state of the air bag apparatus for side crash according to a first embodiment of the present invention.

FIG. 4 is a perspective view showing the air bag apparatus for side crash according to the first embodiment of the present invention. Referring to FIG. 4, the air bag apparatus in the first embodiment is composed of a bag module, an inflater 2, and an acceleration sensor 15 to detect acceleration in the side direction. The acceleration sensor 15 is schematically shown. A pair of the bag module and the inflater 2 is provided for the side section 3 of a seat. An air bag 1 is accommodated in the bag module. The air bag 1 before operation is folded to make the volume small. The inflater 2 spouts high-pressure gas at a moment, when the acceleration sensor 15 detects acceleration in the side direction above a predetermined value. A spouting port for the high-pressure gas is connected to a gas inflow port of the air bag 1. Thus, the high-pressure gas is supplied into the air bag 1 to expand the air bag 1 rapidly. It is desirable that the air bag 1 is covered with a cover which tears easily with the pressure on the expansion.

Figure 5:
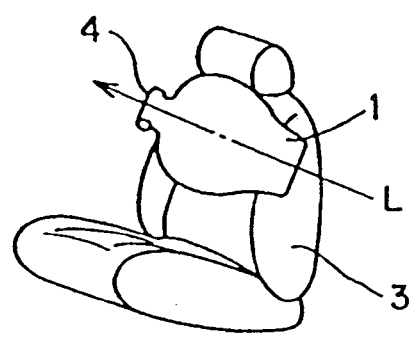
FIG. 5 is a perspective view showing an operation state of the air bag apparatus for side crash in the first embodiment.
Figure 6:
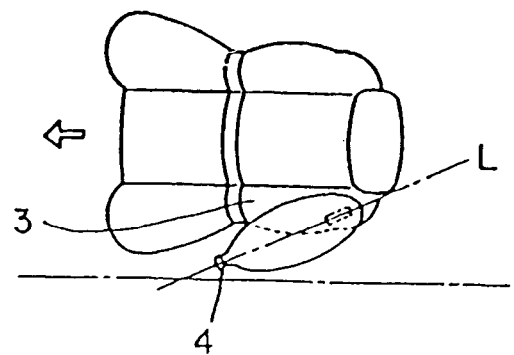
FIG. 6 is a plan view showing an operation state of the air bag apparatus for side crash in the first embodiment.

The air bag 1 expands to the shape shown in FIG. 5 in the effective expansion stage to protect a rider. The air bag 1 is manufactured by sewing a plurality of cloth sections. The shape of the air bag during the expanding process and in the expansion end stage is determined based on the sewed portions. The high-pressure gas is spouted from a gas spouting port of the inflater 2 and supplied into the folded air bag 1. The air bag 1 develops from the folded state at a moment in response to the supply of the high-pressure gas, and extends in a predetermined direction or an expansion direction L, as shown in FIG. 5. The vertical plane containing the expansion direction L is located between the rider and a side body of the car, especially, a center pillar or a window glass of a door. The expansion direction L directs to a right or left upper direction, as shown in FIGS. 5 and 6. Such an air bag 1 has an inner side panel on the side near the rider and an outer side panel on the side farther from the rider, as shown in FIG. 6.

Figure 7:
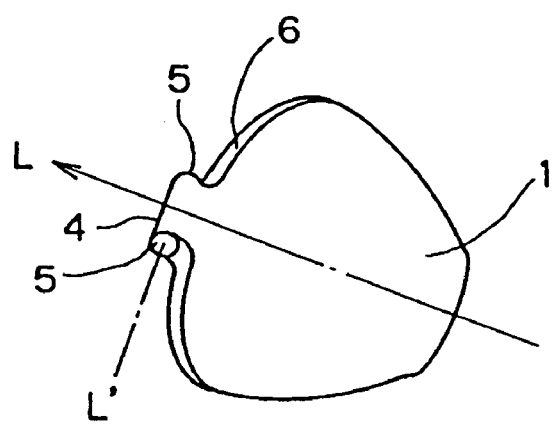
FIG. 7 is a perspective view showing the shape of an air bag of the air bag apparatus in the first embodiment at an expansion end stage.

As shown in FIG. 7, the air bag 1 is composed of an air bag main section and a protrusion section 4, with one end of the main section receiving gas from the inflater 2. The main section 6 and the protrusion section 4 are formed as a unitary body by sewing two sheets of cloth. In the air bag 1 after the expansion, the protrusion section 4 protrudes to the expansion direction L from the tip portion 6 of the main section in the air bag 1, such tip portion being disposed at an opposite end of the main section from the end which receives gas from the inflater 2. The protrusion section 4 has a pipe-like shape and extends substantially tangentially to the tip portion in a direction L' orthogonal to the air bag expansion direction L. The protrusion section 4 has openings 5 at opposing ends and the high-pressure gas spouts from the openings. That is, the openings function as vent holes 5.

Figure 8:
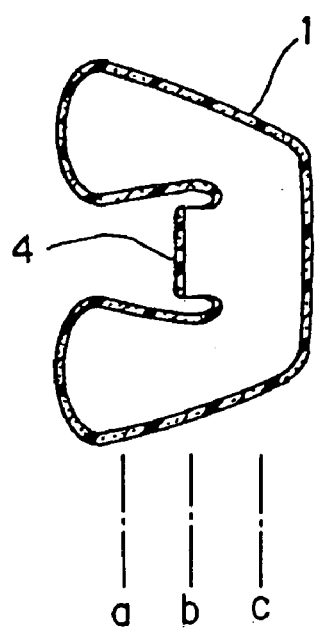
FIG. 8 is a cross sectional view showing the air bag of the air bag apparatus in the first embodiment before fold.

As shown in FIG. 8, before the expansion, the protrusion section 4 is pushed into the air bag 1 into the direction opposite to the expansion direction L while keeping its shape, such that the protrusion section 4 goes between both of the side panels of the air bag 1. The air bag 1 shown in FIG. 8 is folded in a plurality of fold lines a, b and c to reduce the volume, and is accommodated in the side section 3 of the seat as the air bag module, as shown in FIG. 4.

Figure 9A:
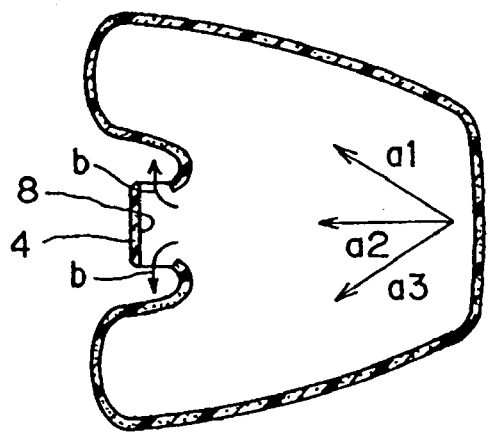
FIGS. 9A, 9B and 9C are cross sectional views showing the expanding process of the air bag of the air bag apparatus in the first embodiment.
Figure 9B:
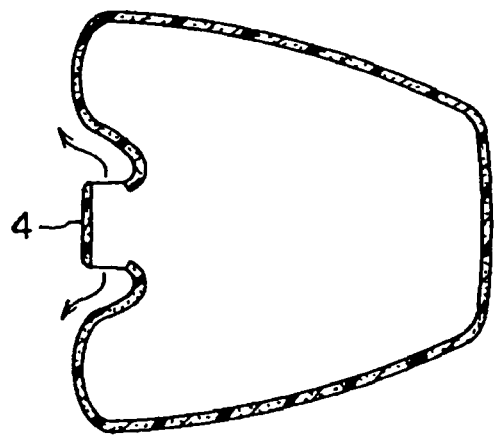
Figure 9C:
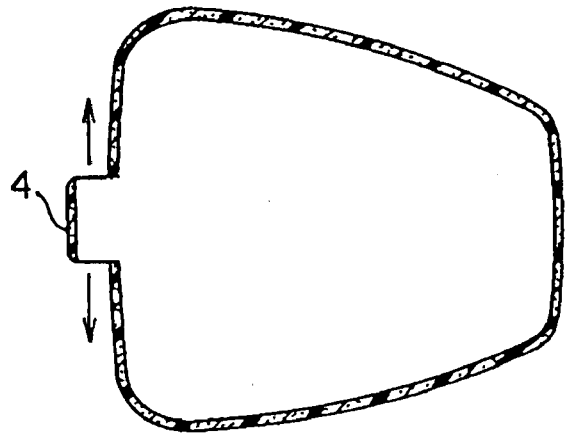

FIGS. 9A, 9B and 9C show the expanding process of the air bag 1 folded as mentioned above. The inflation gas is spouted from one region in the air bag radially, as shown by arrows a1, a2 and a3. The inflation gas flows outwardly as shown by the arrows a1, a2 and a3, runs against the wall 8 of the protrusion section 4, and forms flows b along the wall 8. The flows b are spouted from the vent holes 5 at the both ends of the protrusion section 4. In the first embodiment, the vent holes 5 of the protrusion section 4 are formed in a direction orthogonal to the expansion direction L. The high-pressure gas flows against the wall 8 of the protrusion section 4 and the force of the flow is limited. The gas spouted from the vent hole 5 receives resistance in the surface of the air bag 1 and the flow velocity is limited, because the protrusion section 4 is shorter than the width of the main section in a vertical direction. Such limitation is strong at the expansion start stage shown in FIG. 9A, is weak in the expansion middle stage shown in FIG. 9B, and is the weakest in the expansion end stage shown in FIG. 9C. At the time shown in FIG. 9C, the body of the rider presses the above-mentioned inner side panel. At that time, the quantity of the spouting gas is large and the pressure in the air bag 1 becomes lower than in the expansion start stage and the expansion middle stage. That is, the air bag 1 expands for the rider to be able to be effectively protected when the external force operates on the rider.

Figure 10:
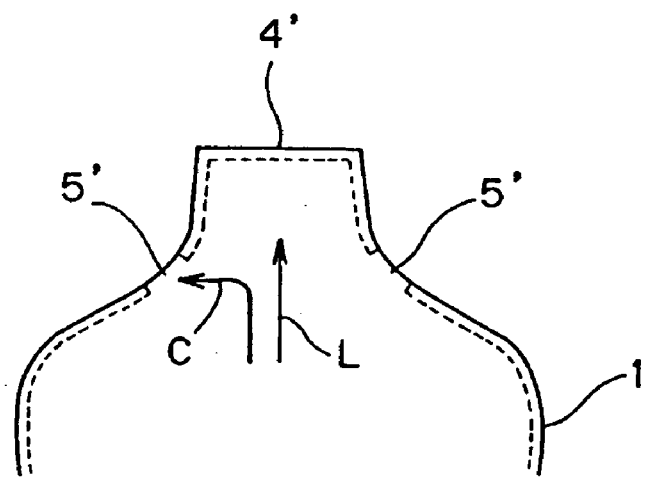
FIG. 10 is a front view showing a first modification of the air bag of the air bag apparatus according to the first embodiment of the present invention.

FIG. 10 shows the first modification of the air bag apparatus for side crash according to the first embodiment of the present invention. The first modification is the same as the first embodiment in that the protrusion section 4' is provided but is different from the first embodiment in that the vent holes 5' are not formed at both opposing ends of the protrusion section 4'. One or more vent holes 5' (two in this example) are formed in the proximal region of the protrusion section 4'. The first modification is the same as the above-mentioned first embodiment in that gas flow in the expansion direction L is decelerated by the protrusion section 4', is changed into a direction C orthogonal to the expansion direction L and then the gas flows out from the vent holes 5'.

Figure 11:
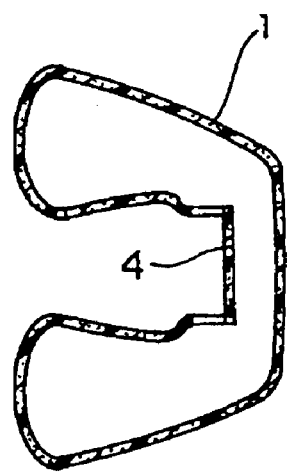
FIG. 11 is a front cross sectional view showing a second modification of the air bag of the air bag apparatus according to the first embodiment of the present invention.

FIG. 11 shows the second modification of the air bag apparatus for side crash according to the first embodiment of the present invention. In the second modification of the air bag apparatus, the protrusion section 4 of the air bag 1 is further pushed into the inner space of the main section of the airbag prior to expansion between the both side panels inside out into the direction opposite to the expansion direction L, as shown in FIG. 11. Thus, the time to the full expansion of the air bag 1 can be adjusted. If any of vent holes 5 is present, the turning-over of the protrusion section 4 is effective.

In this embodiment, the protrusion section 4 is pushed with the pressure of gas in the air bag 1 at the expansion start stage and is transformed to a flat shape to close the vent holes 5. Therefore, the quantity of the gas flowing out from the vent holes 5 of the protrusion section 4 is largely limited. For this reason, the expansion speed at the expansion start stage is faster compared with the example shown in FIG. 8. The protrusion section 4 is turned over to a normal shape in the expanding process to the direction L. At the expansion end stage, the protrusion section 4 is pushed out with the internal pressure to the expansion direction L. In this way, the air bag 1 in the second modification is the same as the above-mentioned expanding process shown in FIGS. 9A, 9B and 9C.

Next, the air bag apparatus for side crash according to the second embodiment of the present invention will be described.

Figure 12:
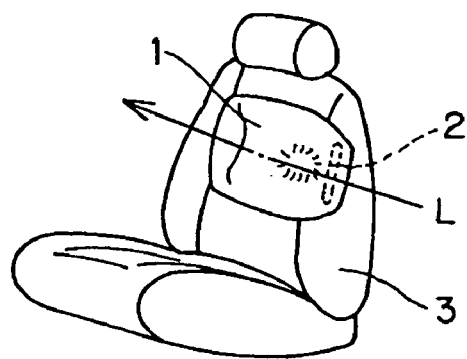
FIG. 12 is a perspective view showing the operation state of the air bag apparatus for side crash according to a second embodiment of the present invention.
Figure 13:
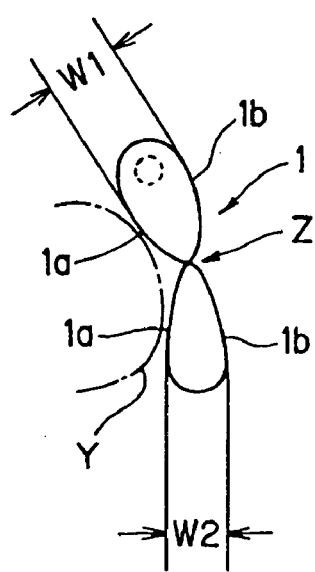
FIG. 13 is a plane cross sectional view showing the operation state of the air bag apparatus according to the second embodiment of the present invention.

FIGS. 12 and 13 show the expansion shape of the sewed air bag 1 of the air bag apparatus in the second embodiment at the effective expansion stage. The air bag 1 expands to have a predetermined shape in the expanding process through the combination of a plurality of cloth sections. That is, the shape of the air bag 1 in the expansion is determined geometrically based on a joining region Z. In this way, the widths W1 and W2 in the horizontal direction in which the inner side panel 1a and the outer side panel 1b oppose to each other can be determined. The high-pressure gas is output from the gas spouting port of the inflater 2 and goes into the folded air bag 1. The air bag 1 receives the supply of the high-pressure gas into the inner space and expands from the fold state to the expansion direction L at a moment, as shown in FIG. 12. The vertical plane containing the expansion direction L is located between the rider and the side section of the car, especially, the center pillar or the window glass of the desk door. The expansion direction L is directed in a right or left upward direction.

In FIG. 13, the upper portion of the body of the rider, especially, the chest collides with the air bag 1 as shown by line Y. With the collision, the width W1 and the width W2 become narrower. As a result, the inner side panel 1a and the outer side panel 1b in the bag 1 become almost parallel to each other. Thus, the air bag 1 can protect the body of the rider effectively.

FIG. 14A shows the shape of the air bag apparatus according to the second embodiment of the present invention at the expansion end stage. The inner space of the air bag 1 is divided into partial spaces 1A, 1B and 1C by partitions 4A and 4B in a vertical direction orthogonal to the expansion direction L, as shown in FIG. 14B. The partitions 4A and 4B are provided in the middle region of the air bag 1 in the expansion direction L. In this way, the partitions 4A and 4B determine the shape of the air bag 1 almost in the expanding process.

The partitions 4A and 4B extend in almost parallel to the expansion direction L in the middle region from a region near the gas inflow port to which the high-pressure gas is supplied from the inflater 2 to the tip region of the air bag 1. The partitions 4A and 4B are achieved as linear sewing portions of the inner side panel 1a and the outer side panel 1b, as shown in FIG. 14B. The peripheral edge portion or limb portion of the air bag 1 is sewed so as to join the outer surface of the inner side panel 1a and the outer surface of the outer side panel 1b. The partitions 4A and 4B are sewed so as to join the inner surface of the inner side panel 1a and the inner surface of the outer side panel 1b.

Through the division of the inner space of the air bag 1, the high-pressure gas flows from the gas inflow port toward the tip region of the air bag 1 as three flows 5A, 5B and 5C. The flow 5A is formed between the upper limb portion of the air bag 1 and the partition 4A, the flow 5B is formed between the partition 4A and the partition 4B, and the flow 5C is formed between the lower limb portion of the air bag 1 and the partition 4B. The three flows 5A, 5B and 5C join as one flow in the tip region 1A of the air bag 1.

The partitions 4A and 4B determine the three flow paths 5A, 5B and 5C. Because the flows of the high-pressure gas in the flow paths 5A, 5B and 5C are determined, it is possible to control the expanding process of the air bag 1 in the spaces 1A, 1B and 1C or the positions and shapes of the partitions 4A and 4B. In this way, the partitions 4A and 4B make it possible to determine the shape of the air bag 1 during the expanding process and for the air bag 1 to expand at high speed to the final shape.

FIGS. 15A and 15B show the shape of the air bag 1 in the first modification of the air bag apparatus in the second embodiment at the expansion end stage. In the first modification, a single partition 4A is provided. The partition 4A is provided to be approximately parallel to the expansion direction L in the proximal region of the air bag 1, and extends in an upper direction along the expansion direction L. The partition 4A extends to a region near the upper limb portion of the air bag 1. In this way, two flow paths are formed. The width of the flow path 5D is narrower than the width of the flow path 5E. Therefore, the high-pressure gas is difficult to flow through the flow path 5D. Therefore, the air bag 1 expands to the direction slightly above the expansion direction L during the expanding process. In this way, by providing the asymmetry spaces, the expansion direction and shape of the air bag 1 during the expanding process can be controlled.

Figure 16:
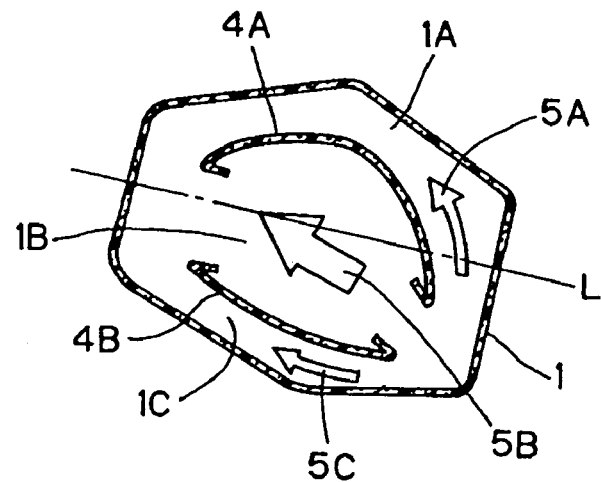
FIG. 16 is a front cross sectional view showing a second modification of the air bag of the air bag apparatus in the second embodiment.

FIG. 16 is the front cross sectional view showing the second modification of the air bag apparatus in the second embodiment. Referring to FIG. 16, the second modification is the same as the second embodiment shown in FIGS. 14A and 14B in that the two partitions 4A and 4B are used the same as the second embodiment. However, in the second modification, the partitions 4A and 4B extend from the proximal region of the air bag 1 to the region near the tip region of the air bag 1, compared with the second embodiment shown in FIGS. 14A and 14B. The partition 4A approaches the upper limb portion of the air bag 1 from the lower portion of the proximal region and curves large along the upper limb portion of the air bag 1. Also, the partition 4B approaches the lower limb portion of the air bag 1 and curves small along the lower limb portion of the air bag 1. Thus, the air bag 1 expands in a lower direction than the expansion direction L during the expanding process.

Figure 17:
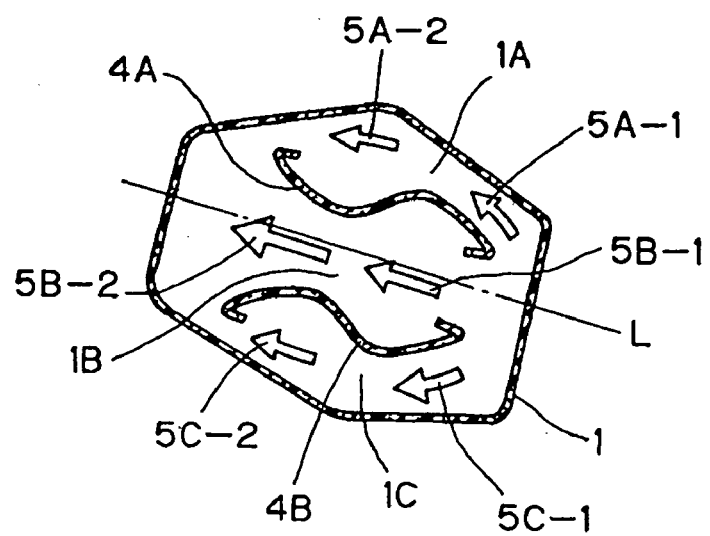
FIG. 17 is s front cross sectional view showing a third modification of the air bag of the air bag apparatus in the second embodiment.

FIG. 17 is the front cross sectional view showing the third modification of the air bag apparatus in the second embodiment. In the third modification, the partitions 4A and 4B in the second embodiment shown in FIGS. 14A and 4B are bent smoothly as much as in the middle region. By this, each of the flow paths 5A, 5B and 5C is composed of regions having an increased cross section and regions having a decreased cross section. The flow path 5A is formed from a narrow flow path 5A-1 on the upstream side and a wide flow path 5A-2 on the downstream side. The flow path 5B is formed from a wide flow path 5B-1 on the upstream side and a narrow flow path 5B-2 on the downstream side. The flow path 5C is formed from a narrow flow path 5C-1 on the upstream side and a wide flow path 5C-2 on the downstream side. The expansion speed of the air bag 1 can be controlled using the combination of the narrow flow paths and the wide flow paths.

Figure 18:
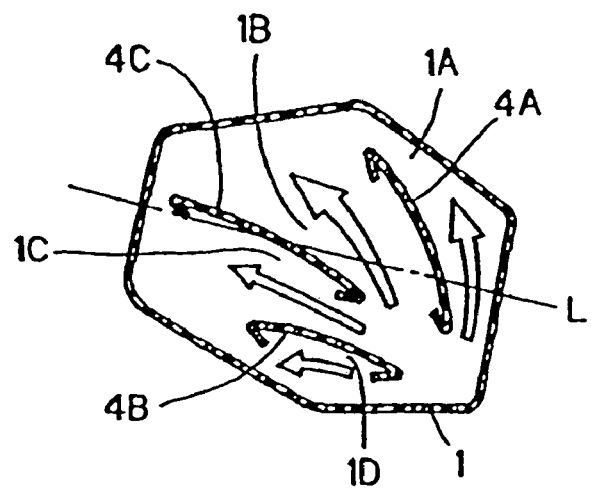
FIG. 18 is a front cross sectional view showing a fourth modification of the air bag of the air bag apparatus in the second embodiment.

FIG. 18 is the front cross sectional view showing the fourth modification of the air bag apparatus in the second embodiment. In the fourth modification, the start points of the partitions 4A and 4B are gathered around one region in lower portion of the proximal region. The gas inflow port of the high-pressure gas from the inflater 2 is placed in such a region. The partitions 4A and 4B extend toward the tip region to be further apart from each other. Thus, the flow path between the partitions 4A and 4B is wide on the downstream side. A third partition 4C is added in the wide flow path between the partitions 4A and 4B. In this way, four flow paths (partial spaces) 1A, 1B, 1C and 1D are formed by the three partitions 4A, 4B and 4C.

The high-pressure gas flows in from the gas inflow port into the air bag 1, and flows into four directions radially through the above four flow paths and in an upper direction as a whole. Thus, the expansion direction L during the expanding process can be determined well while receiving a rectification effect. The flow in the radial directions makes the expansion performance good.

Figure 19:
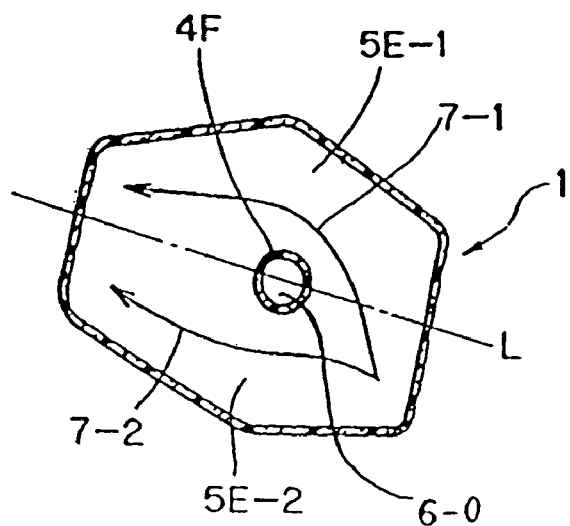
FIG. 19 is a front cross sectional view showing a fifth modification of the air bag of the air bag apparatus in the second embodiment.

FIG. 19 is the front cross sectional view showing the fifth modification of the air bag apparatus in the second embodiment. A partition 4F has a sewing line for a closed local circle region 6-0 in the center portion of the air bag 1. Flow paths 5E-1 and 5E-2 form central rectification lines 7-1 and 7-2 on both sides of the local region 6-0 which sinks in the direction orthogonal to the side panel, respectively. Thus, the fifth modification shows a low resistance rectification performance.

Figure 20:
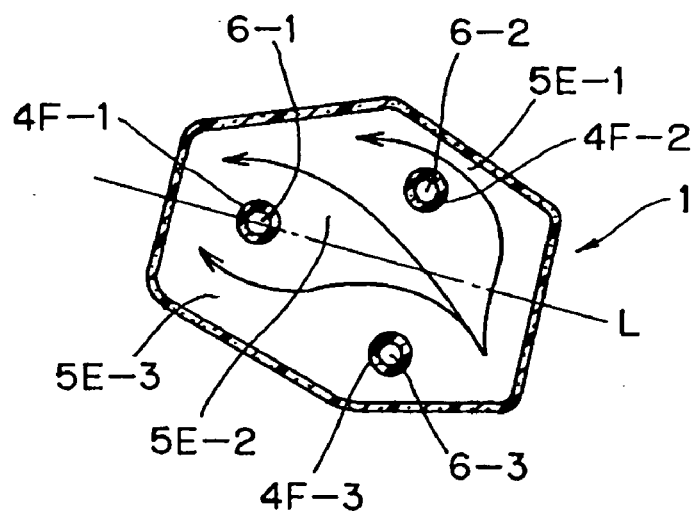
FIG. 20 is a front cross sectional view showing a sixth modification of the air bag of the air bag apparatus in the second embodiment.

FIG. 20 is the front cross sectional view showing the sixth modification of the air bag apparatus in the second embodiment. Partitions 4F-1, 4F-2 and 4F-3 have the sewing lines to surround three local circle regions 6-1, 6-2 and 6-3 which are arranged in 3 vertexes of a triangle in the air bag 1. Each of flow paths 5E-l, 5E-2 and 5E-3 forms a central rectification line on both sides of a corresponding local region which sinks in the direction orthogonal to the side panel of the air bag 1. The sixth modification shows a low resistance rectification performance and is more excellent in the shape limitation.

Figure 21:
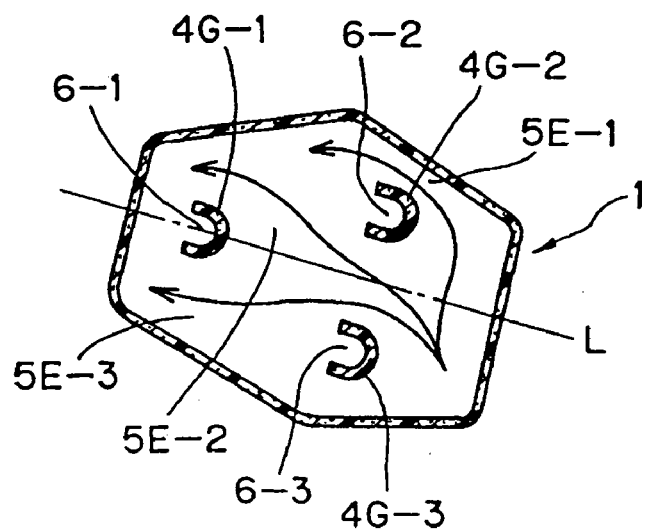
FIG. 21 is a front cross sectional view showing a seventh modification of the air bag of the air bag apparatus in the second embodiment.

FIG. 21 is the front cross sectional view showing the seventh modification of the air bag apparatus in the second embodiment. The seventh modification is the same as the sixth modification in that partitions 4G-1, 4G-2 and 4G-3 are arranged in 3 vertexes of the triangle in the air bag 1. However, in the seventh modification, each of the partitions 4G-1, 4G-2 and 4G-3 has a sewing line to half way surround a corresponding one of three local circle regions 6-1, 6-2 and 6-3. The local circle region is not fully surrounded and the downstream side is opened. Such opening eases shape limitation on the downstream side. Each of flow paths 5E-1, 5E-2 and 5E-3 forms a central rectification line on both sides of a corresponding local region which sinks in the direction orthogonal to the side panel of the air bag 1. The seventh modification shows a low resistance rectification performance and is more excellent in the shape limitation.

As described above, the width in the horizontal direction is definitely determined. The shape of the flow path is definitely determined. Also, the inflation gas is rectified and expansion efficiency is increased. The shape restriction and rectification operation are shown at the same time.

In the air bag apparatus for side crash of the present invention, the expansion shape restriction during the expanding process is deliberately determined. Also, it is possible to previously determine rapid expansion at the expansion start stage and the exhaust of the gas at the expansion end stage. Consequently, the expansion energy can be efficiently used.

Although there have been described what are the present embodiments of the invention, it will be understood by persons skilled in the art that variations and modifications may be made thereto without departing from the gist, spirit or essence of the invention.

What is claimed is:

1. An air bag apparatus for shielding a vehicle occupant in the event of a side crash, said air bag apparatus comprising:
an acceleration sensor which detects acceleration in a side direction larger than a predetermined value to generate a detection signal;
an inflater which generates a gas in response to said detection signal; and
an air bag which is folded initially, and expands with said gas, wherein said air bag comprises a main section having one end which receives gas from said inflater and a protrusion section which is provided attached to and extending outwardly away from a tip portion of said main section such that an inner space of said protrusion section is connected with an inner space of said main section, said tip portion being disposed at an opposite end of the main section from said one end, said protrusion section extending substantially tangentially to the tip portion of said main section in a direction orthogonal to an expansion direction of the air bag and having at least one opening formed therein from which said gas is spouted.

2. The air bag apparatus according to claim 1, wherein said protrusion section extends beyond said main section and comprises a pipe shape with openings formed therein at opposing ends thereof.

3. The air bag apparatus according to claim 1, wherein said protrusion section is narrower than said tip portion of said main section and said at least one opening is formed in a portion thereof connected with and spaced away from said main section by an intermediate portion of the protrusion section.

4. The air bag apparatus according to claim 1, wherein said protrusion section is pushed into the inner space of said main section prior to expansion.

5. The air bag apparatus according to claim 1, wherein said main section comprises first and second side panels, which are sewed in a limb portion for contacting a limb of a vehicle occupant, such that outer surfaces of said first and second side panels are joined to each other.

6. The air bag apparatus according to claim 1, wherein said main section comprises first and second side panels, and further wherein said air bag has at least one partition provided between said side panels in said inner space of said main section.

7. The air bag apparatus according to claim 6, wherein said at least one partition is formed by sewing a predetermined portion of said first and second side panels.

8. The air bag apparatus according to claim 7, wherein said predetermined portion is shaped as one of a curved line, a circle or a semicircle.

9. The air bag apparatus according to claim 7, wherein each said predetermined portion is substantially linear or S-shaped.

10. The air bag apparatus according to claim 7, including multiple said partitions defined by respective predetermined portions and wherein said predetermined portions are shaped differently from each other.

11. The air bag apparatus according to claim 7, wherein said predetermined portion determines an expansion direction of said air bag during an expanding process.

12. An air bag apparatus for shielding a vehicle occupant in the event of a side crash, said air bag apparatus comprising:
an acceleration sensor which detects acceleration in a side direction larger than a predetermined value to generate a detection signal;
an inflater which generates a gas in response to said detection signal; and
an air bag which is folded initially, and expands with said gas, wherein said air bag comprises a main section having one end which receives gas from said inflater and a protrusion section which is provided attached to and extending outwardly away from a tip pardon of said main section such that an inner space of said protrusion section is connected with an inner space of said main section, said tip portion being disposed at an opposite end of the main section from said one end, said protrusion section extending substantially tangentially to the tip portion of said main section in a direction orthogonal to an expansion direction of the air bag and having at least one opening formed therein from which said gas is spouted;
wherein said protrusion section is pushed into the inner space of said main section prior to expansion such that said protrusion section is turned inside out.

13. An air bag used for an air bag apparatus for shielding a vehicle occupant in the event of a side crash, said airbag comprising:
a main section having one end which receives gas from an inflater; and
a protrusion section which is attached to and extends outwardly away from a tip portion of said main section in an expanded configuration of said air bag such that an inner space of said protrusion section is connected with an inner space of said main section, wherein said air bag is folded initially, and expands with the gas from the inflater, said tip portion being disposed at an opposite end of the main section from said one end, and said protrusion section extends substantially tangentially to the tip portion of said main section in a direction orthogonal to an expansion direction of the air bag and has at least one opening formed therein from which said gas is spouted.

14. The air bag according to claim 13, wherein said protrusion section extends outwardly beyond the main section and comprises a pipe shape with openings formed therein at opposing ends thereof.

15. The air bag according to claim 13, wherein said protrusion section is narrower than said tip portion and has at least one opening in a portion thereof connected with said main section and spaced away therefrom by an intermediate portion of the protrusion section, and wherein upon deployment of said air bag, gas is expelled from said opening in a direction substantially perpendicular to a substantially linear expansion direction.

16. The air bag according to claim 13, wherein said protrusion section is pushed into the inner space of said main section prior to expansion.

17. An air bag for use in an air bag apparatus to shield a vehicle occupant in the event of a side crash, said air bag comprising:
  a main section having one end which receives gas from an inflater; and
  a protrusion section which is attached to and extends outwardly away from a tip portion of said main section in an expanded configuration of said air bag such that an inner space of said protrusion section is connected with an inner space of said main section,
  wherein said air bag is folded initially, and expands with the gas from the inflater, said tip portion being disposed at an opposite end of the main section from said one end, and said protrusion section extends substantially tangentially to the tip portion of said main section in a direction orthogonal to an expansion direction of the air bag and has at least one opening formed therein from which said gas is spouted;
  wherein said protrusion section is pushed into the inner space of said main section prior to expansion such that said protrusion section is turned inside out.

* * * * *